(12) United States Patent
Bathe

(10) Patent No.: US 7,046,766 B2
(45) Date of Patent: May 16, 2006

(54) DEVICE FOR GENERATING X-RAYS HAVING AN INTEGRATED ANODE AND BEARING MEMBER

(75) Inventor: Christoph Helmut Bathe, Hamburg (DE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 56 days.

(21) Appl. No.: 10/498,137

(22) PCT Filed: Dec. 11, 2002

(86) PCT No.: PCT/IB02/05347

§ 371 (c)(1),
(2), (4) Date: Jun. 8, 2004

(87) PCT Pub. No.: WO03/050840

PCT Pub. Date: Jun. 19, 2003

(65) Prior Publication Data

US 2005/0036585 A1    Feb. 17, 2005

(30) Foreign Application Priority Data

Dec. 13, 2001    (EP) .................................. 01204872

(51) Int. Cl.
*H01J 35/10*    (2006.01)
*H01J 35/26*    (2006.01)

(52) U.S. Cl. ........................................ 378/132; 378/144
(58) Field of Classification Search ................ 378/132, 378/144

See application file for complete search history.

(56) References Cited

U.S. PATENT DOCUMENTS

| 5,077,775 | A | | 12/1991 | Vetter ......................... 378/132 |
| 5,668,849 | A | * | 9/1997 | Sugiura et al. ............. 378/133 |
| 5,809,106 | A | * | 9/1998 | Kitade et al. ................ 378/132 |
| 6,157,702 | A | * | 12/2000 | Reznikov et al. ........... 378/144 |
| 6,198,805 | B1 | * | 3/2001 | Jambunathan et al. ...... 378/144 |

FOREIGN PATENT DOCUMENTS

JP    2000205285 A  *  7/2000

\* cited by examiner

*Primary Examiner*—Edward J. Glick
*Assistant Examiner*—Krystyna Suchecki

(57) ABSTRACT

A device for generating X-rays includes source for emitting electrons; a carrier having a material that generates X-rays in response to the electrons; and dynamic groove bearing configured to rotate the carrier. The dynamic groove bearing has a portion with grooves. The carrier includes a member that extends away from the carrier to cover at least the portion having the grooves. The carrier and the member are a single piece.

5 Claims, 1 Drawing Sheet

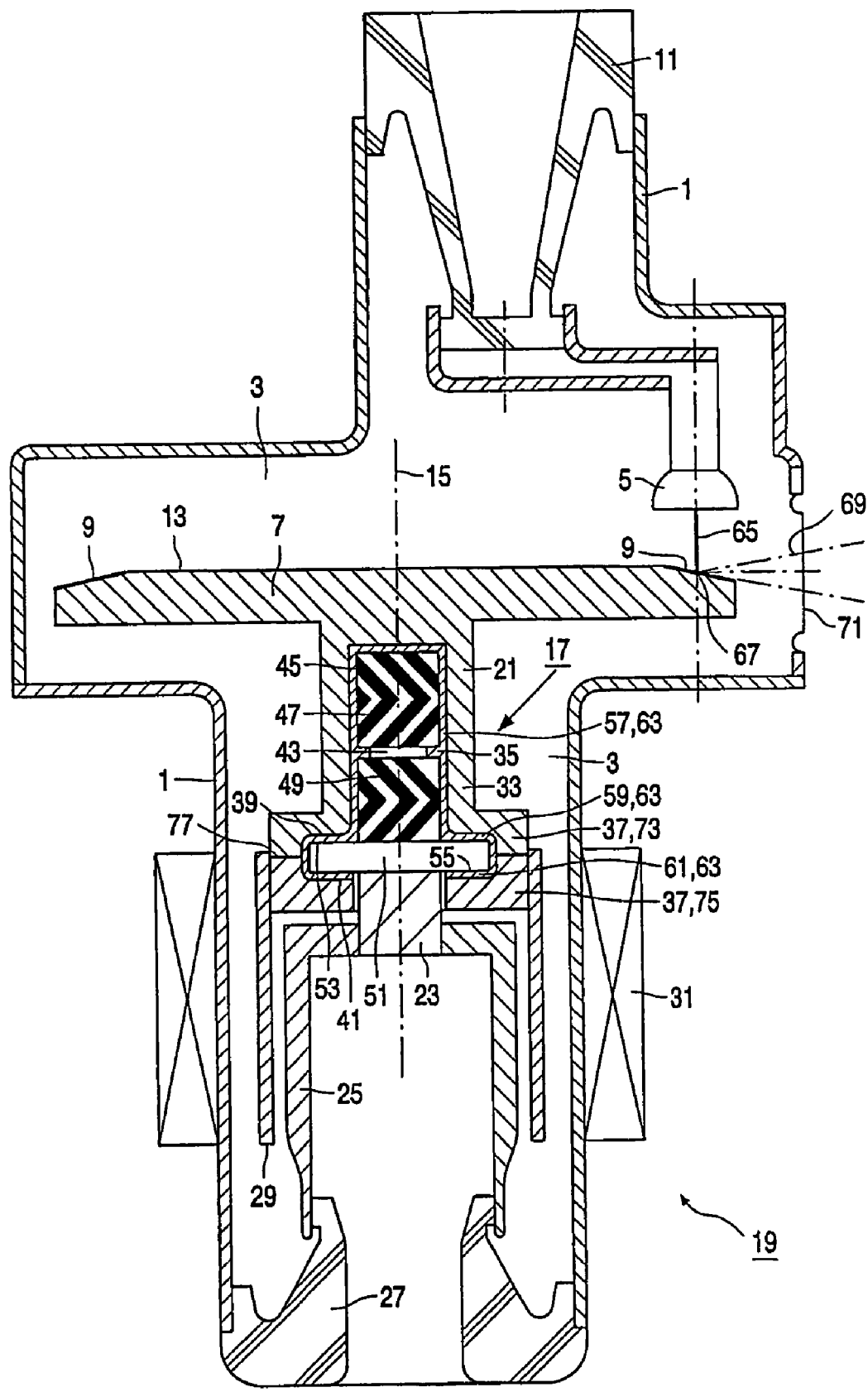

DEVICE FOR GENERATING X-RAYS HAVING AN INTEGRATED ANODE AND BEARING MEMBER

The invention relates to a device for generating X-rays, which device comprises a source for emitting electrons, a carrier which is provided with a material which generates X-rays as a result of the incidence of electrons, and a dynamic groove bearing having an internal bearing member and an external bearing member by means of which the carrier is journalled so as to be rotatable about an axis of rotation, a first one of the bearing members being connected to the carrier, and a bearing gap containing a liquid lubricant being present between the bearing members.

A device for generating X-rays of the kind mentioned in the opening paragraph is known from U.S. Pat. No. 5,077,775. During operation of this known device, X-rays are generated in an impingement position on the carrier where an electron beam generated by the source impinges upon the X-ray generating material. The carrier is disc-shaped and is rotated about the axis of rotation, so that the impingement position follows a circular path relative to the carrier. As a result, the heat, which is generated in the X-ray generating material as a result of the impingement of the electron beam upon said material, is evenly distributed along said circular path and over the entire carrier, so that the carrier is evenly warmed up. The bearing gap of the dynamic groove bearing is enclosed between a circular cylindrical outer surface of the internal bearing member, which is connected to a housing of the device, and a circular cylindrical inner surface of the outer bearing member, which is connected to the carrier, said outer surface being provided with a pattern of grooves. Since the carrier is present in a vacuum space within said housing, heat transfer from the carrier to the surroundings of the device takes place substantially exclusively via said inner and outer surface and the liquid lubricant present in the bearing gap between said surfaces. Since said surfaces have relatively large surface areas in order to provide sufficiently large bearing forces, the rate of heat transfer via the bearing gap is considerable, so that the warming up of the carrier is limited.

A disadvantage of the known device for generating X-rays is that the rate of heat transfer via the bearing gap appears to be insufficiently high when the energy level of the electron beam generated by the source, and hence also the energy level of the generated X-rays, is relatively high A considerable reduction of said rate of heat transfer is even ascertained when the temperature of the carrier rises beyond a certain threshold value.

An object of the invention is to provide a device for generating X-rays of the kind mentioned in the opening paragraph in which the rate of heat transfer via the bearing gap is improved, and in which a reduction of said rate of heat transfer at relatively high temperatures of the carrier is prevented as much as possible.

In order to achieve said object, a device for generating X-rays according to the invention is characterized in that at least a portion of the first bearing member, which portion at least partially covers the bearing gap, and the carrier together constitute an integral part of the device. The invention is based on the insight that the rate of heat transfer between two parts which are attached to each other in an assembling process, like the carrier and the external bearing member of the device known from U.S. Pat. No. 5,077,775, is considerably reduced as a result of the fact that a material separation is present between the two parts at the location of the mounting surfaces via which these parts contact each other. Said reduction is a result of the limited smoothness and limited accuracy of the shape of said mounting surfaces. At high temperatures, thermal deformation of said mounting surfaces occurs, as a result of which the rate of heat transfer between the two parts is even reduced. Since in the device according to the invention said portion of the first bearing member and the carrier together constitute an integral part of the device, said portion and the carrier do not constitute separate parts of the device which are mounted together during the assembling process of the device, but constitute a single part which does not have a material separation as described before. As a result, the rate of heat transfer from the carrier via the part of the bearing gap covered by said portion of the first bearing member is not reduced by such a material separation and, therefore, is not further reduced either by thermal deformations at high temperatures.

A particular embodiment of a device for generating X-rays according to the invention is characterized in that said portion of the first bearing member and the carrier are manufactured from a single piece of material. This embodiment does not only provide an improved rate of heat transfer from the carrier via the bearing gap, but also provides a simplification of the assembling process of the device.

A further embodiment of a device for generating X-rays according to the invention is characterized in that said portion of the first bearing member substantially completely covers the bearing gap. In this embodiment, the rate of heat transfer via the bearing gap is further improved as a result of the fact that the heat transfer path from the carrier to all parts of the bearing gap is free from material separations formed by mounting surfaces between separate parts.

Hereafter, embodiments of a device for generating X-rays according to the invention will be described as shown in the drawings, in which FIG. 1 schematically shows a longitudinal section of a device for generating X-rays according to the invention.

The device for generating X-rays according to the invention as shown in FIG. 1 comprises a metal housing 1 enclosing a vacuum space 3 which accommodates a source 5 or cathode for emitting electrons and a carrier 7 or anode provided with a material 9 which generates X-rays as a result of the incidence of electrons. The source 5, which is only schematically shown in FIG. 1, is attached to the housing 1 by means of a first mounting member 11 made from an electrically insulating material. The carrier 7 is substantially disc-shaped, and the X-ray generating material 9, e.g. W, is provided in the form of an annular layer on the main side 13 of the carrier 7 facing the source 5. The carrier 7 is made from a material having a relatively high melting point, e.g. graphite or a ceramic material such as $BC_4$ or AlN. Alternatively, the entire carrier 7 may be made from the X-ray generating material.

The carrier 7 is rotatable about an axis of rotation 15 which extends perpendicularly to the main side 13. For this purpose the device comprises a dynamic groove bearing 17 by means of which the carrier 7 is journalled, and an electric motor 19 by means of which the carrier 7 can be driven. The dynamic groove bearing 17 comprises an external bearing member 21, which is connected to the carrier 7, and an internal bearing member 23, which is attached to the housing 1 by means of a supporting member 25 and a second mounting member 27 made from an electrically insulating material. The motor 19, which is only schematically shown in FIG. 1, comprises a rotor 29, which is also present in the vacuum space 3 and is attached to the external bearing member 21, and a stator 31, which is present outside the vacuum space 3 and is attached to an external surface of the housing 1.

The external bearing member 21 comprises a sleeve-shaped portion 33, which has a circular cylindrical inner surface 35 having a center line coinciding with the axis of rotation 15, and a flange-shaped portion 37, which has two annular inner surfaces 39 and 41 extending perpendicularly to the axis of rotation 15. The internal bearing member 23 comprises a shaft-like portion 43, which has a circular-cylindrical outer surface 45 provided with two patterns 47 and 49 of V-shaped grooves, and a disc-shaped portion 51, which has two annular outer surfaces 53 and 55, each provided with a pattern of V-shaped grooves which are not visible in FIG. 1. A circular-cylindrical bearing gap 57 is present between the inner surface 35 of the sleeve-shaped portion 33 and the outer surface 45 of the shaft-like portion 43, and annular bearing gaps 59 and 61 are present between the inner surface 39 of the flange-shaped portion 37 and the outer surface 53 of the disc-shaped portion 51 and between the inner surface 41 of the flange-shaped portion 37 and the outer surface 55 of the disc-shaped portion 51, respectively. The bearing gaps 57, 59, 61 contain a liquid lubricant 63, e.g. a gallium alloy such as GaInSn. During rotation of the dynamic groove bearing 17, a pressure is maintained in the liquid lubricant 63 in the bearing gap 57 as a result of a pumping action of the V-shaped grooves 47, 49 provided on the outer surface 45 of the shaft-like portion 43, which provides bearing forces in the radial direction. Likewise, a pressure is maintained in the liquid lubricant 63 in the bearing gaps 59 and 61 as a result of a pumping action of the V-shaped grooves provided on the outer surfaces 53 and 55 of the disc-shaped portion 51, which provides bearing forces in the axial direction. As a further result of said pressure in the liquid lubricant 63, mechanical contact between the external bearing member 21 and the internal bearing member 23 is avoided, so that the dynamic groove bearing 17 has a long service life and causes very little noise.

During operation, the source 5 generates an electron beam 65 which impinges upon the X-ray generating material 9 in an impingement position 67. X-rays 69 generated by the material 9 as a result of the incidence of the electron beam 65 emanate from the vacuum space 3 through a window 71, which is provided in the housing 1 and is made from an X-ray transparent material, e.g. Be. During the generation of the X-rays 69, only a very small portion of the energy of the electron beam 65 is converted into X-ray energy. Most of the energy of the electron beam 65 is converted into heat, which results in a considerable increase of the temperature of the carrier 7, particularly when comparatively high energy levels of the X-rays 69 are generated. To avoid excessive local heating of the carrier 7, the carrier 7 is rotated about the axis of rotation 15 during operation, so that the impingement position 67 follows a circular path relative to the carrier 7 over the annular layer of the X-ray generating material 9. As a result, said heat is evenly distributed along said circular path and across the entire carrier 7.

Since the carrier 7 is present in the vacuum space 3, heat transfer from the carrier 7 to the surroundings of the device, or to a cooling unit of the device not shown in FIG. 1, which heat transfer is necessary to avoid excessive heating of the carrier 7, takes place substantially exclusively via a heat transfer path which successively comprises the external bearing member 21, the inner surfaces 35, 39, 41 of the external bearing member 21, the liquid lubricant 63 in the bearing gaps 57, 59, 61, the outer surfaces 45, 53, 55 of the internal bearing member 23, the internal bearing member 23, the supporting member 25, and the second mounting member 27. The rate of this heat transfer via the bearing gaps 57, 59, 61 is considerable because the inner surfaces 35, 39, 41 and the outer surfaces 45, 53, 55 have relatively large surface areas in order to provide sufficiently large bearing forces.

In the device according to the invention, the rate of heat transfer from the carrier 7 to the surroundings of the device is improved as a result of the fact that the carrier 7, the sleeve-shaped portion 33 of the external bearing member 21, and a first portion 73 of the flange-shaped portion 37 of the external bearing member 21, which first portion 73 comprises the annular inner surface 39, are manufactured from a single piece of material and hence together constitute an integral part of the device. A second portion 75 of the flange-shaped portion 37 of the external bearing member 21, which second portion 75 comprises the annular inner surface 41, constitutes a separate part of the device which is attached to said first portion 73 during the assembling process of the device. As a consequence, a material separation 77 is present between said first and second portions 73 and 75, which separation 77 is necessary to allow for the disc-shaped portion 51 of the internal bearing member 23 to be positioned between the annular inner surfaces 39 and 41 during the assembling process. Since the sleeve-shaped portion 33 and the first portion 73 of the flange-shaped portion 37 of the external bearing member 21 completely cover the bearing gaps 57 and 59, and since the carrier 7, the sleeve-shaped portion 33, and said first portion 73 constitute an integral part, the portion of the heat transfer path between the carrier 7 and the bearing gaps 57 and 59 does not include a material separation. A material separation between two parts, which is present at the location of the mounting surfaces of said parts via which said parts contact each other, considerably reduces the rate of heat transfer between said parts as a result of the limited smoothness and limited accuracy of the mounting surfaces. At high temperatures, the rate of heat transfer may even be further reduced as a result of thermal deformation of the mounting surfaces. Since such material separations are not present between the carrier 7 and the bearing gaps 57 and 59, a relatively high rate of heat transfer, particularly also at relatively high temperatures of the carrier 7, exists along the portion of the heat transfer path which includes the bearing gaps 57 and 59. Only the portion of the heat transfer path which includes the bearing gap 61 has a rate of heat transfer which is reduced by the material separation 77. As a result, an adequate rate of heat transfer from the carrier 7 to the surroundings of the device is achieved also at relatively high temperatures of the carrier 7, so that the device according to the invention is suitable for generating X-rays having a relatively high energy level.

In the embodiment of the device according to the invention as shown in FIG. 1, the carrier 7 and the portions 33 and 73 of the external bearing member 21 together constitute an integral part of the device as a result of the fact that the carrier 7 and said portions 33 and 73 are manufactured from a single piece of material. It is to be noted that the invention also covers embodiments in which the carrier and at least a portion of the bearing member, which is connected to the carrier, together constitute an integral part in another manner. The invention, for example, also covers embodiments in which the carrier and said portion of said bearing member are soldered or welded together into one integral part.

In the embodiment of the device according to the invention as shown in FIG. 1, the portions 33 and 73 of the external bearing member 21, which constitute an integral part together with the carrier 7, partially cover the entire bearing gap between the external bearing member 21 and the internal bearing member 23, said entire bearing gap being constituted in this embodiment by the bearing gaps 57, 59, and 61. In this manner, the heat transfer path between the carrier 7 and the entire bearing gap is partially free from material separations. It is to be noted that the invention also covers embodiments in which the portion of the bearing member, which constitutes an integral part together with the carrier, substantially completely covers the entire bearing gap. The heat transfer path between the carrier 7 and the entire bearing gap is then completely free from material separations. Such an alternative embodiment is, for example, obtained by omitting, in the device of FIG. 1, the disc-shaped portion 51 of the internal bearing member 23 and the flange-shaped portion 37 of the external bearing member 21, and by providing the upper surface of the shaft-like portion 43 of the internal bearing member 23, which upper surface faces the carrier 7, with a pattern of grooves and providing the liquid lubricant also in a further bearing gap between said upper surface and a lower surface of the carrier 7.

Finally it is to be noted that the integral part comprising the carrier and at least a portion of the bearing member connected to the carrier can be made from any suitable material, in particular a material having a relatively high melting point. The integral part may be made, for example, from W, Mo, Ta, or from alloys containing W, Mo, or Ta.

The invention claimed is:

1. A device for generating X-rays comprising:
 a source for emitting electrons,
 a carrier is provided with a material which generates X-rays as a result of the incidence of electrons, and
 a dynamic groove bearing having an internal bearing member and an external bearing member by means of which the carrier is journalled so as to be rotatable about an axis of rotation, said dynamic groove bearing having grooves,
 a first one of the bearing members being connected to the carrier, and a bearing gap containing a liquid lubricant being present between the bearing members,
 wherein at least a portion of the first bearing member, which portion at least partially covers the bearing gap and said grooves, and the carrier are a single piece.

2. The device as claimed in claim 1, wherein said portion of the first bearing member substantially completely covers the bearing gap.

3. A device for generating X-rays comprising:
 source for emitting electrons;
 a carrier having a material that generates X-rays in response to said electrons; and
 a dynamic groove bearing configured to rotate said carrier, said dynamic groove bearing having a portion with grooves;
 wherein said carrier includes a member that extends away from said carrier to cover at least said portion having said grooves; said carrier and said member being a single piece.

4. The device of claim 3, wherein said member partially covers said dynamic groove bearing.

5. The device of claim 3, wherein said member completely covers said dynamic groove bearing.

* * * * *